United States Patent
Dawson et al.

(10) Patent No.: US 11,684,977 B2
(45) Date of Patent: Jun. 27, 2023

(54) ADVANCED HEATING METHOD AND SYSTEM

(71) Applicant: Utility Global, Inc., Houston, TX (US)

(72) Inventors: Matthew Dawson, Katy, TX (US); Nicholas Farandos, Greystones (IE); Jin Dawson, Katy, TX (US); Chris Matson, Dublin (IE)

(73) Assignee: Utility Global, Inc., Houston, TX (US)

( * ) Notice: Subject to any disclaimer, the term of this patent is extended or adjusted under 35 U.S.C. 154(b) by 286 days.

(21) Appl. No.: 17/078,251

(22) Filed: Oct. 23, 2020

(65) Prior Publication Data

US 2021/0121978 A1   Apr. 29, 2021

Related U.S. Application Data

(60) Provisional application No. 62/941,358, filed on Nov. 27, 2019, provisional application No. 62/927,627, (Continued)

(51) Int. Cl.
*B23K 26/00* (2014.01)
*B22F 10/36* (2021.01)
(Continued)

(52) U.S. Cl.
CPC .............. *B22F 10/36* (2021.01); *B22F 1/052* (2022.01); *B22F 3/1017* (2013.01); (Continued)

(58) Field of Classification Search
None
See application file for complete search history.

(56) References Cited

U.S. PATENT DOCUMENTS 8,367,983 B2 * 2/2013 Ranish et al. ........... H05B 3/68
219/455.12
9,204,500 B2  12/2015 Ikeda et al.
(Continued)

FOREIGN PATENT DOCUMENTS

EP      0 554 538 B1   8/1993
JP      2018-046130 A  3/2018
(Continued)

OTHER PUBLICATIONS

Machine translation of KR 20140050093 A performed on Sep. 20, 2022, Hopkinson et al. (Year: 2014).*
(Continued)

*Primary Examiner* — Brian W Jennison
*Assistant Examiner* — Kevin Guanhua Wen
(74) *Attorney, Agent, or Firm* — Foley & Lardner LLP

(57) ABSTRACT

Herein discussed is a method of heating a material having a surface comprising exposing the surface to an electromagnetic radiation source emitting a first wavelength spectrum; receiving a second wavelength spectrum from the surface using a detector at a sampling frequency; wherein the first wavelength spectrum and the second wavelength spectrum have no greater than 10% of overlap, wherein the overlap is the integral of intensity with respect to wavelength. In an embodiment, the first wavelength spectrum and the second wavelength spectrum have no greater than 5% of overlap or no greater than 3% of overlap or no greater than 1% of overlap or no greater than 0.5% of overlap. In an embodiment, exposing the surface to the radiation source causes the material to sinter at least partially.

18 Claims, 2 Drawing Sheets

Related U.S. Application Data filed on Oct. 29, 2019, provisional application No. 62/925,210, filed on Oct. 23, 2019.

(51) Int. Cl.

| | |
|---|---|
| *B33Y 50/02* | (2015.01) |
| *B22F 3/10* | (2006.01) |
| *B23K 26/03* | (2006.01) |
| *B23K 26/062* | (2014.01) |
| *B22F 1/052* | (2022.01) |
| *B33Y 30/00* | (2015.01) |

(52) U.S. Cl.
CPC ........ *B23K 26/0006* (2013.01); *B23K 26/032* (2013.01); *B23K 26/034* (2013.01); *B23K 26/062* (2015.10); *B33Y 50/02* (2014.12); *B33Y 30/00* (2014.12)

(56) References Cited

U.S. PATENT DOCUMENTS

| | | | |
|---|---|---|---|
| 2018/0250775 A1* | 9/2018 | Spink et al. | ......... B23K 26/342 |
| 2018/0372327 A1 | 12/2018 | Jordens et al. | |
| 2019/0054652 A1* | 2/2019 | Song et al. | ............... B28B 1/00 |

FOREIGN PATENT DOCUMENTS

| | | | | |
|---|---|---|---|---|
| KR | 20140050093 A | * | 4/2014 | ........... B29C 64/153 |
| KR | 20160035004 A | * | 3/2016 | ............... H01B 1/22 |
| WO | WO 2019156674 A1 | * | 8/2019 | ............. B33Y 10/00 |

OTHER PUBLICATIONS

Qian, B., Shen, Z. (Sep. 19, 2013). Laser Sintering of Ceramics. Journal of Asian Ceramic Societies. Retrieved Sep. 20, 2022, from https://www.sciencedirect.com/science/article/pii/S2187076413000584#section-cited-by (Year: 2013).*

Montgomery, J. M., Lipp, M. J., Jenei, Z., Meng, Y., Evans, W. J. (Feb. 16, 2018). A simple and portable multi-channel pyrometer allowing temperature measurements down to 800 K on the microsecond scale. Review of Scientific Instruments. (Year: 2018).*

Determining an Effective Analog Sampling Rate, Sealevel (Sep. 17, 2019). Wayback Machine. (Year: 2019).*

Muñoz-Sierra, Julian & Lafita, Carlos & Gabaldón, Carmen & Spanjers, Henri. (2017). Trace metals supplementation in Anaerobic membrane bioreactors treating highly saline phenolic wastewater. Bioresource Technology. 234. 106-114. 10.1016/j.biortech.2017.03.032. (Year: 2017).*

Machine translation of KR 20160035004 A performed on Sep. 21, 2022, Ida et al. (Year: 2016).*

International Search Report and Written Opinion on PCT Appl. Ser. No. PCT/US2020/056985 dated Feb. 17, 2021 (10 pages).

* cited by examiner

ADVANCED HEATING METHOD AND SYSTEM

CROSS-REFERENCE TO RELATED APPLICATIONS

This application claims the benefit under 35 U.S.C. 119(e) of U.S. Provisional Patent Application No. 62/925,210 filed Oct. 23, 2019, U.S. Provisional Patent Application No. 62/927,627 filed Oct. 29, 2019, and U.S. Provisional Patent Application No. 62/941,358 filed Nov. 27, 2019. The entire disclosures of each of these listed applications are hereby incorporated herein by reference.

TECHNICAL FIELD

This invention generally relates to heating of materials. More specifically, this invention relates to advanced heating method and system with monitoring.

BACKGROUND

Ceramics are a category of materials that have found many applications due to their hard, heat-resistant, and corrosion-resistant properties. Before a ceramic is utilized, an advanced heating process is needed to cause the ceramic material to sinter. Sintering is the process of compacting and forming a solid mass of material by heat or pressure without melting it to the point of liquefaction. Ceramic sintering is typically performed by firing the ceramic in a furnace. Some advanced applications of ceramics include bioceramics, gas turbine engines, watch making, and electrochemical devices. For example, solid oxide fuel cell (SOFC) is a type of electrochemical devices that ceramics are useful in. The electrolyte in a SOFC is a necessary and important part of the device, which is often a ceramic material. The manufacturing of electrolytes (and various parts of the SOFC) is a complex and expensive process, which requires heating to cause sintering. This is traditionally accomplished via furnace sintering. Herein we disclose advanced heating methods and systems with monitoring without the use of a furnace.

SUMMARY

Herein discussed is a method of heating a material having a surface comprising exposing the surface to an electromagnetic radiation source emitting a first wavelength spectrum; receiving a second wavelength spectrum from the surface using a detector at a sampling frequency; wherein the first wavelength spectrum and the second wavelength spectrum have no greater than 10% of overlap, wherein the overlap is the integral of intensity with respect to wavelength. In an embodiment, the first wavelength spectrum and the second wavelength spectrum have no greater than 5% of overlap or no greater than 3% of overlap or no greater than 1% of overlap or no greater than 0.5% of overlap. In an embodiment, the detector is a pyrometer.

In an embodiment, exposing the surface to the radiation source causes the material to sinter at least partially. In an embodiment, the method comprises converting the second wavelength spectrum to temperature and corelating sintering with temperature, exposure duration, exposure frequency, exposure number, radiation source power output, or combinations thereof. In an embodiment, sintering is determined by microstructure images of the material, scratch adhesion test of the material, scratch hardness test of the material, electrochemical performance test of the material, dilatometry measurements of the material, conductivity measurements of the material, or combinations thereof.

In an embodiment, the radiation source is a xenon lamp. In an embodiment, the method comprises adjusting voltage supplied to the xenon lamp to change the radiation source power output or the first wavelength spectrum or both. In an embodiment, the first wavelength spectrum comprises UV light, near ultraviolet light, near infrared light, infrared light, visible light, laser, electron beam, microwave, or combinations thereof.

In an embodiment, the method comprises converting the second wavelength spectrum to temperature and adjusting the sampling frequency according to rate of temperature change. In an embodiment, the sampling frequency is higher than normalized rate of temperature change, wherein the normalized rate of temperature change is the rate of temperature change divided by the difference between a local temperature maximum and a local temperature minimum.

In an embodiment, a single exposure duration is no greater than 10 ms or no greater than 5 ms or no greater than 2 ms or no greater than 1 ms or in the range of 0.1-1 ms. In an embodiment, total exposure duration is no greater than 10 s or no greater than 5 s or no greater than 1 s. In an embodiment, the sampling frequency is no less than 100 Hz or no less than 500 Hz or no less than 1000 Hz or no less than 10,000 Hz or no less than 50,000 Hz.

In an embodiment, the material comprises Cu, CuO, $Cu_2O$, Cu—CGO, Ni, NiO, NiO—YSZ, silver, ferritic steel, stainless steel, crofer, lanthanum strontium cobalt ferrite (LSCF), lanthanum strontium manganite (LSM), yttria-stabilized zirconia (YSZ), gadolinia-doped ceria (CGO), samaria-doped ceria (SDC), scandia-stabilized zirconia (SSZ), lanthanum strontium gallium magnesium oxide (LSGM), ceria-yttria stabilized zirconia (CYZ), ceria-scandia stabilized zirconia (CSZ), zirconia, lanthanum chromite, doped lanthanum chromite, doped YSZ, colored zirconia, carbon, graphite, graphene, or combinations thereof. In an embodiment, heating takes place in two stages, wherein the material porosity after the second stage heating is less than that after the first stage heating.

In an embodiment, the material comprises particles having a size distribution that has at least one of the following characteristics: said size distribution comprises D10 and D90, wherein 10% of the particles have a diameter no greater than D10 and 90% of the particles have a diameter no greater than D90, wherein D90/D10 is in the range of from 1.5 to 100; or said size distribution is bimodal such that the average particle size in the first mode is at least 5 times the average particle size in the second mode; or said size distribution comprises D50, wherein 50% of the particles have a diameter no greater than D50, wherein D50 is no greater than 400 nm.

In an embodiment, D10 is in the range of from 5 nm to 50 nm or from 5 nm to 100 nm or from 5 nm to 200 nm, or D90 is in the range of from 50 nm to 500 nm or from 50 nm to 1000 nm, or wherein D90/D10 is in the range of from 2 to 100 or from 4 to 100 or from 2 to 20 or from 2 to 10 or from 4 to 20 or from 4 to 10.

In an embodiment, the material comprises particles, wherein a first 10 wt % or more of the particles have an average diameter of d, a second 10 wt % or more of the particles have an average diameter of at least 5×d, and a third 10 wt % or more of the particles have an average diameter of at least 20×d. In an embodiment, d is in the range of from 1 nm to 100 nm or from 5 nm to 50 nm or from 10 nm to 30 nm.

Further aspects and embodiments are provided herein below in the drawings, detailed description and claims. Unless specified otherwise, the features as discussed herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
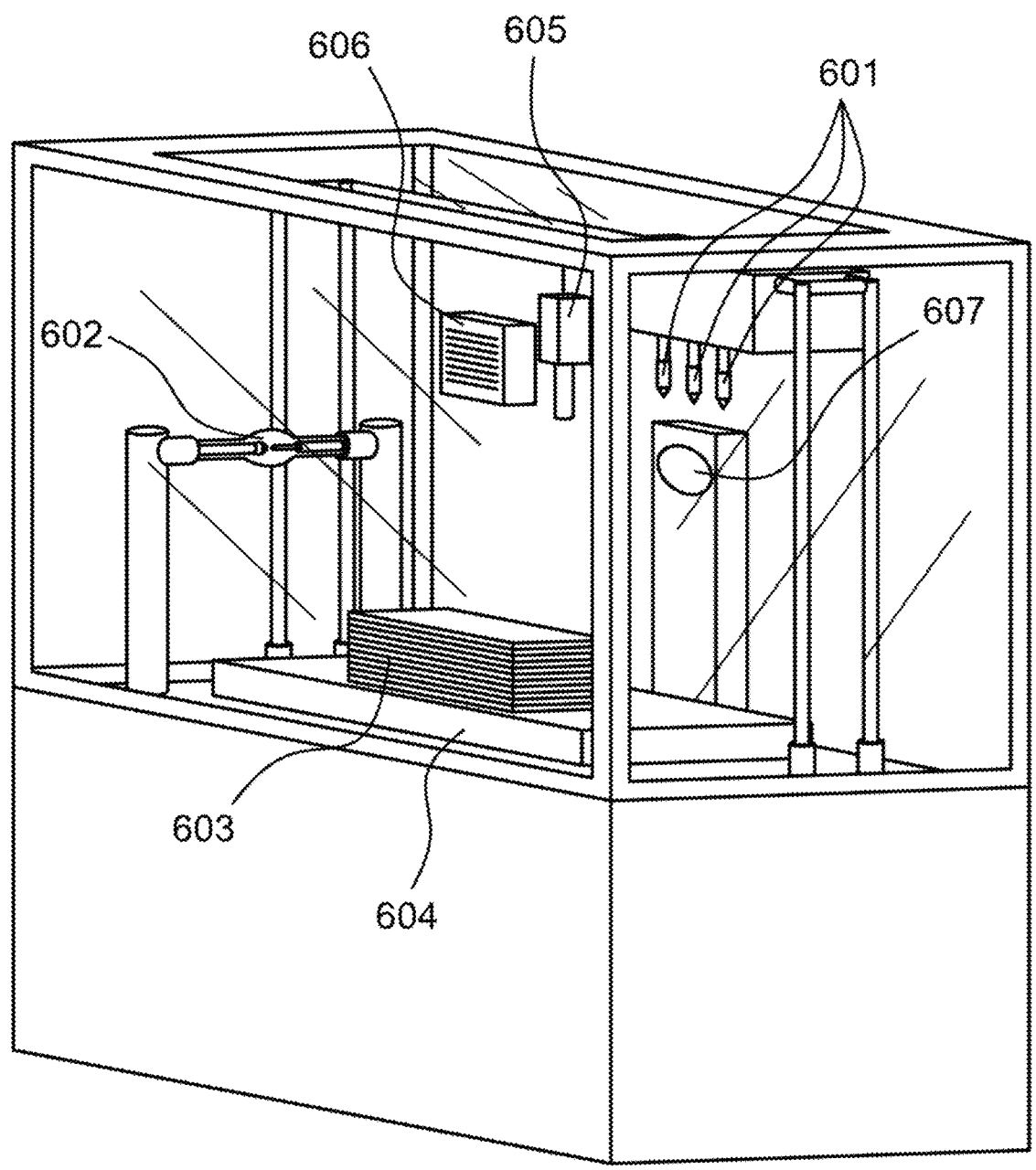
FIG. 1 illustrates a method and system of integrated deposition and heating using electromagnetic radiation (EMR), according to an embodiment of this disclosure.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

In this disclosure, sintering refers to a process to form a solid mass of material by heat or pressure or combination thereof without melting the material to the extent of liquefaction. For example, material particles are coalesced into a solid or porous mass by being heated, wherein atoms in the material particles diffuse across the boundaries of the particles, causing the particles to fuse together and form one solid piece. In this disclosure, $T_{sinter}$ refers to the temperature at which this phenomenon begins to take place.

Advanced Heating

An advanced heating method according to this disclosure comprises heating a material having a surface by exposing the surface to an electromagnetic radiation (EMR) source emitting a first wavelength spectrum; receiving a second wavelength spectrum from the surface using a detector at a sampling frequency; wherein the first wavelength spectrum and the second wavelength spectrum have no greater than 10% of overlap, wherein the overlap is the integral of intensity with respect to wavelength. In various cases, the first wavelength spectrum and the second wavelength spectrum have no greater than 5% of overlap or no greater than 3% of overlap or no greater than 1% of overlap or no greater than 0.5% of overlap. In an embodiment, the detector is a pyrometer.

In an embodiment, exposing the surface to the radiation source causes the material to sinter at least partially. In various cases, the method comprises converting the second wavelength spectrum to temperature and corelating sintering with temperature, exposure duration, exposure frequency, exposure number, radiation source power output, or combinations thereof. In some embodiments, sintering is determined by microstructure images of the material (e.g., scanning electron microscopy images), scratch adhesion test of the material, scratch hardness test of the material, electrochemical performance test of the material, dilatometry measurements of the material, conductivity measurements of the material, or combinations thereof.

In an embodiment, the radiation source is a xenon lamp. In an embodiment, the method comprises adjusting voltage supplied to the xenon lamp to change the radiation source power output or the first wavelength spectrum or both. In various embodiments, the first wavelength spectrum comprises UV light, near ultraviolet light, near infrared light, infrared light, visible light, laser, electron beam, microwave, or combinations thereof.

In an embodiment, the method comprises converting the second wavelength spectrum to temperature and adjusting the sampling frequency according to rate of temperature change. For example, the sampling frequency is higher than normalized rate of temperature change, wherein the normalized rate of temperature change is the rate of temperature change divided by the difference between a local temperature maximum and a local temperature minimum.

In an embodiment, a single exposure duration is no greater than 10 ms or no greater than 5 ms or no greater than 2 ms or no greater than 1 ms or in the range of 0.1-1 ms. In an embodiment, total exposure duration is no greater than 10 s or no greater than 5 s or no greater than 1 s. In an embodiment, the sampling frequency is no less than 100 Hz or no less than 500 Hz or no less than 1000 Hz or no less than 10,000 Hz or no less than 50,000 Hz. For example, a pyrometer is used as the detector, having a sampling frequency of 100,000 Hz.

In an embodiment, heating takes place in two stages, wherein the material porosity after the second stage heating is less than that after the first stage heating. In some cases, the first stage heating causes certain components in the material to be burned off. In some cases, the second stage heating causes the material to sinter partially, or to sinter substantially, or to sinter fully. In some cases, the second stage heating causes the material to fully densify (e.g., having a porosity of no greater than 1% or no greater than 0.1%).

In an embodiment, the EMR source comprises a xenon lamp. In an embodiment, the EMR consists of one exposure, or no greater than 10 exposures, or no greater than 100 exposures, or no greater than 1000 exposures, or no greater than 10,000 exposures. In an embodiment, the EMR has an exposure frequency of $10^{-4}$-1000 Hz or 1-1000 Hz or 10-1000 Hz. In an embodiment, the EMR has an exposure distance of no greater than 50 mm. In an embodiment, the EMR has an exposure duration no less than 0.1 ms or 1 ms. In an embodiment, the EMR is applied with a capacitor voltage of no less than 100V.

In a further embodiment, the EMR has a peak frequency ranging from 10 to 1500 nm and the EMR has a minimum energy density of 0.1 Joule/cm$^2$. Exposing a material to the EMR has one or more of the following effects: heating, drying, curing, sintering, annealing, sealing, alloying, evaporating, restructuring, foaming.

In an embodiment, the EMR has a minimum energy density of 1 joule/cm$^2$. In an embodiment, the EMR has a minimum energy density of 10 joule/cm$^2$. In an embodiment, the EMR has a power output of no less than 1 watt. In an embodiment, the EMR has a power output of no less than 10 watts. In an embodiment, the EMR has a power output of no less than 100 watts. In an embodiment, the EMR has a power output of no less than 1000 watts. In an embodiment, peak frequency of the EMR is between 10 and 1500 nm or between 50 and 550 nm or between 100 and 300 nm. In an embodiment, the material is distanced from the EMR source by less than 50 cm or 10 cm or 1 cm or 1 mm.

In an embodiment, the method comprises controlling distance from the EMR to the substrate; intensity of the EMR; spectrum of the EMR; duration of exposure; frequency of exposure; exposure repetition number; or combinations thereof. In an embodiment, EMR exposure has a surface area of no less than 1 mm$^2$, no less than 1 cm$^2$, no less than 10 cm$^2$, or no less than 100 cm$^2$.

In an embodiment, the material comprises Cu, CuO, Cu2O, Cu-CGO, Ni, NiO, NiO—YSZ, silver, ferritic steel, stainless steel, crofer, lanthanum strontium cobalt ferrite (LSCF), lanthanum strontium manganite (LSM), yttria-stabilized zirconia (YSZ), gadolinia-doped ceria (CGO), samaria-doped ceria (SDC), scandia-stabilized zirconia (SSZ), lanthanum strontium gallium magnesium oxide (LSGM), ceria-yttria stabilized zirconia (CYZ), ceria-scandia stabilized zirconia (CSZ), zirconia, lanthanum chromite, doped lanthanum chromite, doped YSZ, colored zirconia, carbon, graphite, graphene, or combinations thereof.

In an embodiment, the material comprises particles, wherein the particles have a size distribution that has at least one of the following characteristics: the size distribution comprises D10 and D90, wherein 10% of the particles have a diameter no greater than D10 and 90% of the particles have a diameter no greater than D90, wherein D90/D10 is in the range of from 1.5 to 100; or the size distribution is bimodal such that the average particle size in the first mode is at least 5 times the average particle size in the second mode; or the size distribution comprises D50, wherein 50% of the particles have a diameter no greater than D50, wherein D50 is no greater than 400 nm. In an embodiment, D50 is no greater than 100 nm. In an embodiment, D10 is in the range of from 5 nm to 50 nm or from 5 nm to 100 nm or from 5 nm to 200 nm, or D90 is in the range of from 50 nm to 500 nm or from 50 nm to 1000 nm, or wherein D90/D10 is in the range of from 2 to 100 or from 4 to 100 or from 2 to 20 or from 2 to 10 or from 4 to 20 or from 4 to 10.

In an embodiment, D50 is no greater than 50 nm, or no greater than 30 nm, or no greater than 20 nm, or no greater than 10 nm, or no greater than 5 nm. In an embodiment, the average particle size in the first mode is at least 10 times or 15 times or 20 times the average particle size in the second mode. In an embodiment, the particles have a diameter in the range of from 1 nm to 1000 nm, wherein D10 is in the range of from 1 nm to 10 nm and D90 is in the range of from 50 nm to 500 nm.

In an embodiment, a first 10 wt % or more of the particles have an average diameter of d, a second 10 wt % or more of the particles have an average diameter of at least 5×d, and a third 10 wt % or more of the particles have an average diameter of at least 20×d. In an embodiment, d is in the range of from 1 nm to 100 nm or from 5 nm to 50 nm or from 10 nm to 30 nm. In an embodiment, the third 10 wt % or more of the particles have an average of diameter of at least 36×d or at least 50×d or at least 100×d. In an embodiment, the second 10 wt % or more of the particles have an average of diameter of at least 6×d or at least 7×d or at least 8×d or at least 10×d.

In an embodiment, a first 20 wt % or more of the particles have an average diameter of d, a second 20 wt % or more of the particles have an average diameter of at least 533 d, and a third 20 wt % or more of the particles have an average diameter of at least 20×d. In an embodiment, a first 30 wt % or more of the particles have an average diameter of d, a second 30 wt % or more of the particles have an average diameter of at least 5×d, and a third 30 wt % or more of the particles have an average diameter of at least 20×d.

In an embodiment, the second 10 wt % or more of the particles have an average of diameter of at least 6×d and the third 10 wt % or more of the particles have an average of diameter of at least 36×d. In an embodiment, the second 10 wt % or more of the particles have an average of diameter of at least 7×d or 8×d and the third 10 wt % or more of the particles have an average of diameter of at least 50×d. In an embodiment, the second 10 wt % or more of the particles have an average of diameter of at least 10×d and the third 10 wt % or more of the particles have an average of diameter of at least 100×d.

Herein disclosed is a method of sintering a material comprising heating the material using electromagnetic radiation (EMR) or conduction or both in a first stage; measuring the material temperature T within time t after the last exposure of the EMR without contacting the material, wherein t is no greater than 5 seconds; comparing T with $T_{sinter}$. In an embodiment, $T_{sinter}$ is no less than 45% of the melting point of the material if the material is non-metallic, or wherein $T_{sinter}$ is no less than 60% of the melting point of the material if the material is metallic. In an embodiment, $T_{sinter}$ is previously determined by correlating the measured temperature with microstructure images of the material, scratch adhesion test of the material, scratch hardness test of the material, electrochemical performance test of the material, dilatometry measurements of the material, conductivity measurements of the material, or combinations thereof.

In an embodiment, t is no greater than 4 seconds, or no greater than 3 seconds, or no greater than 2 seconds, or no greater than 1 second. In an embodiment, measuring the material temperature T comprises using an infrared sensor, an infrared camera, a pyrometer, a bolometer, or combinations thereof.

In an embodiment, the method comprises heating the material using EMR or conduction or both in a second stage if T is less than 90% of $T_{sinter}$. In an embodiment, the EMR in the first stage or in the second stage is delivered in one exposure, or no greater than 10 exposures, or no greater than 100 exposures, or no greater than 1000 exposures, or no greater than 10,000 exposures. In an embodiment, the EMR in the second stage is used at the same voltage, number of exposures, exposure duration, burst frequency, EMR spectrum, exposure distance, EMR energy density, or combinations thereof as the first stage. In an embodiment, the porosity of the material after the second stage sintering is less than that after the first stage sintering. In an embodiment, the material has greater densification after the second stage sintering than after the first stage sintering.

In an embodiment, the material comprises either LSCF, LSM, YSZ, CGO, Samaria-doped ceria (SDC), Scandia-stabilized zirconia (SSZ), LSGM, Cu, CuO, Cu2O, Cu-CGO, Ni, NiO, NiO—YSZ, silver, ferritic steel, stainless steel, lanthanum chromite, doped lanthanum chromite, crofer, or combinations thereof. In an embodiment, the material comprises particles having a particle size distribution comprising D10 and D90, wherein 10% of the particles have a diameter no greater than D10 and 90% of the particles have a diameter no greater than D90, wherein D90/D10 is in the range of from 1.5 to 100. In an embodiment, the particle size distribution is a number distribution determined by dynamic light scattering or TEM. In an embodiment, D10 is in the range of from 5 nm to 50 nm or from 5 nm to 100 nm or from 5 nm to 200 nm, or D90 is in the range of from 50 nm to 500 nm or from 50 nm to 1000 nm, or wherein D90/D10 is in the range of from 2 to 100 or from 4 to 100 or from 2 to 20 or from 2 to 10 or from 4 to 20 or from 4 to 10. In an embodiment, the particles have a diameter in the range of from 1 nm to 1000 nm, wherein D10 is in the range of from 1 nm to 10 nm and D90 is in the range of from 50 nm to 500 nm. In an embodiment, the material has a thickness of no greater than 1 mm or no greater than 500 microns or no greater than 300 microns or no greater than 100 microns or no greater than 50 microns or no greater than 10 microns or no greater than 5 microns or no greater than 1 micron or no greater than 0.5 micron.

Further disclosed herein is a system for sintering a material comprising an electromagnetic radiation (EMR) source; a receiver configured to contain the material and allow the material to receive the electromagnetic radiation and configured to apply conductive heat to the material; a non-contact temperature sensor configured to measure the temperature of the material. In an embodiment, the EMR source is a xenon lamp. In an embodiment, the non-contact temperature sensor comprises an infrared sensor, an infrared camera, a pyrometer, a bolometer, or combinations thereof. In an embodiment, the non-contact temperature sensor is configured to measure the material temperature within time t after the last exposure of the EMR, wherein t is no greater than 5 seconds.

In an embodiment, the system comprises a computer readable medium containing instructions that, when executed by a processer, cause the processor to compare the measured material temperature T with $T_{sinter}$. In an embodiment, $T_{sinter}$ is previously determined by correlating the measured temperature with microstructure images of the material, scratch adhesion test of the material, scratch hardness test of the material, electrochemical performance test of the material, dilatometry measurements of the material, conductivity measurements of the material, or combinations thereof. In an embodiment, $T_{sinter}$ is no less than 45% of the melting point of the material if the material is non-metallic; or wherein $T_{sinter}$ is no less than 60% of the melting point of the material if the material is metallic. In an embodiment, the instructions cause the processor to direct the EMR source to heat the material or to direct the receiver to conductively heat the material or both in a second stage if T is less than 90% of $T_{sinter}$. In an embodiment, the instructions cause the processor to direct the temperature sensor to measure the material temperature within time t after the last exposure of the EMR.

In an embodiment, t is no greater than 4 seconds, or no greater than 3 seconds, or no greater than 2 seconds, or no greater than 1 second. In an embodiment, the system comprises at least one deposition nozzle configured to deposit the material on the receiver. In an embodiment, the system comprises a non-contact dryer configured to dry the material on the receiver before the material receives the electromagnetic radiation. In an embodiment, the non-contact dryer comprises infrared heater, hot air blower, ultraviolet (UV) light source, or combinations thereof. In some cases, the UV light source initiates reactions (e.g., polymerization reactions) that are exothermic or endothermic. The exothermic or endothermic reactions in turn cause a drying effect of the material. In an embodiment, the dryer is configured to dry the material for a period in the range of from 1 ms to 1 min or from 1 s to 30 s or from 3 s to 10 s.

In an embodiment, the instructions cause the processor to direct the at least one deposition nozzle to deposit the material on the receiver; to direct the non-contact dryer to dry the material; to direct the EMR source to heat the material or to direct the receiver to conductively heat the material or both; and to direct the temperature sensor to measure the material temperature within time t after the last exposure of the EMR. In an embodiment, the instructions cause the processor to compare the measured material temperature T with $T_{sinter}$.

Integrated Deposition and Heating

Further discussed herein is a method of manufacturing comprising a) depositing a composition on a substrate to form a slice; b) drying the slice for no more than 1 minute; c) heating the slice using electromagnetic radiation (EMR) or conduction or both; and d) measuring the slice temperature T within time t after the last exposure of the EMR without contacting the slice, wherein t is no greater than 5 seconds. The advanced heating method with all its aspects as discussed above is applicable for the integrated deposition and heating method and system.

In an embodiment, the method comprises repeating steps a)-d) to produce an object slice by slice. In an embodiment, said object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel, or combinations thereof.

In an embodiment, the method comprises e) comparing T with $T_{sinter}$ to determine if at least a portion of the slice is sintered. In an embodiment, at least a portion of the slice is sintered if T is no less than 90% of $T_{sinter}$. In an embodiment, $T_{sinter}$ is previously determined by correlating the measured temperature with microstructure images of the slice, scratch test of the slice, electrochemical performance test of the slice, dilatometry measurements of the slice, conductivity measurements of the slice, or combinations thereof. In an embodiment, $T_{sinter}$ is no less than 45% of the melting point of the composition if the composition is non-metallic; or wherein $T_{sinter}$ is no less than 60% of the melting point of the composition if the composition is metallic. In an embodiment, the method comprises heating the slice using EMR or conduction or both in a second stage if T is less than 90% of $T_{sinter}$. In an embodiment, t is no greater than 4 seconds, or no greater than 3 seconds, no greater than 2 seconds, or no greater than 1 second.

In an embodiment, the composition comprises either LSCF, LSM, YSZ, CGO, Samaria-doped ceria (SDC), Scandia-stabilized zirconia (SSZ), LSGM, Cu, CuO, Cu2O, Cu—CGO, Ni, NiO, NiO—YSZ, silver, ferritic steel, stainless steel, lanthanum chromite, doped lanthanum chromite, crofer, or combinations thereof. In an embodiment, the composition comprises particles having a particle size distribution comprising D10 and D90, wherein 10% of the particles have a diameter no greater than D10 and 90% of the particles have a diameter no greater than D90, wherein D90/D10 is in the range of from 1.5 to 100. In an embodiment, the slice has a thickness of no greater than 1 mm or no greater than 500 microns or no greater than 300 microns or no greater than 100 microns or no greater than 50 microns or no greater than 10 microns or no greater than 5 microns or no greater than 1 micron or no greater than 0.5 micron.

In an embodiment, drying takes place for a period in the range of from 1 s to 30 s or from 3 s to 10 s. In an embodiment, drying is performed by a non-contact dryer. In an embodiment, said non-contact dryer comprises infrared heater, hot air blower, ultraviolet light source, or combinations thereof. In some cases, the UV light source initiates reactions (e.g., polymerization reactions) that are exothermic or endothermic. The exothermic or endothermic reactions in turn cause a drying effect of the material.

Herein also disclosed is a system comprising at least one deposition nozzle, an electromagnetic radiation (EMR) source, and a deposition receiver, wherein the deposition receiver is configured to receive EMR exposure and deposition at the same location. In some cases, the receiver is configured such that it receives deposition for a first time period, moves to a different location in the system to receive EMR exposure for a second time period.

Referring to FIG. 1, 601 represents deposition nozzles or material jetting nozzles; 602 represents EMR source, e.g., a xenon lamp; 603 represents object being formed; and 604 represents a receiver as a part of an additive manufacturing machine (AMM). 605 represents a measuring modality that provides information (e.g., surface properties) regarding the deposited slice. For example, 605 is a camera or a microscope or a laser scanner. 606 represents a non-contact dryer, e.g., an infrared lamp or an infrared heater. 607 represents a detector or a non-contact temperature sensor, e.g., a pyrometer.

As illustrated in FIG. 1, the receiver 604 is configured to receive both deposition from nozzles and radiation from an EMR source. In various embodiments, deposition nozzles 601 are movable. In various embodiments, the receiver 604 is movable. In various embodiments, the EMR source 602 is movable. In various embodiments, the object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel, or combinations thereof.

Fuel Cell

A fuel cell is an electrochemical apparatus that converts the chemical energy from a fuel into electricity through an electrochemical reaction. There are various types of fuel cells, e.g., proton-exchange membrane fuel cells (PEMFCs), solid oxide fuel cells (SOFCs). A fuel cell typically comprises an anode, a cathode, an electrolyte, an interconnect, optionally a barrier layer and/or optionally a catalyst. The various layers of the SOFC require advanced heating before the SOFC becomes functional. As such, SOFC is used as an application example in this disclosure. The method and system of this disclosure are applicable in other fields where heated/sintered materials are utilized.

Both the anode and the cathode are electrodes. The listings of material for the electrodes, the electrolyte, and the interconnect in a fuel cell are applicable in other electrochemical devices, such as gas producer or compressor. These listings are only examples and not limiting. Furthermore, the designations of anode material and cathode material are also not limiting because the function of the material during operation (e.g., whether it is oxidizing or reducing) determines whether the material is used as an anode or a cathode.

Figure 2:
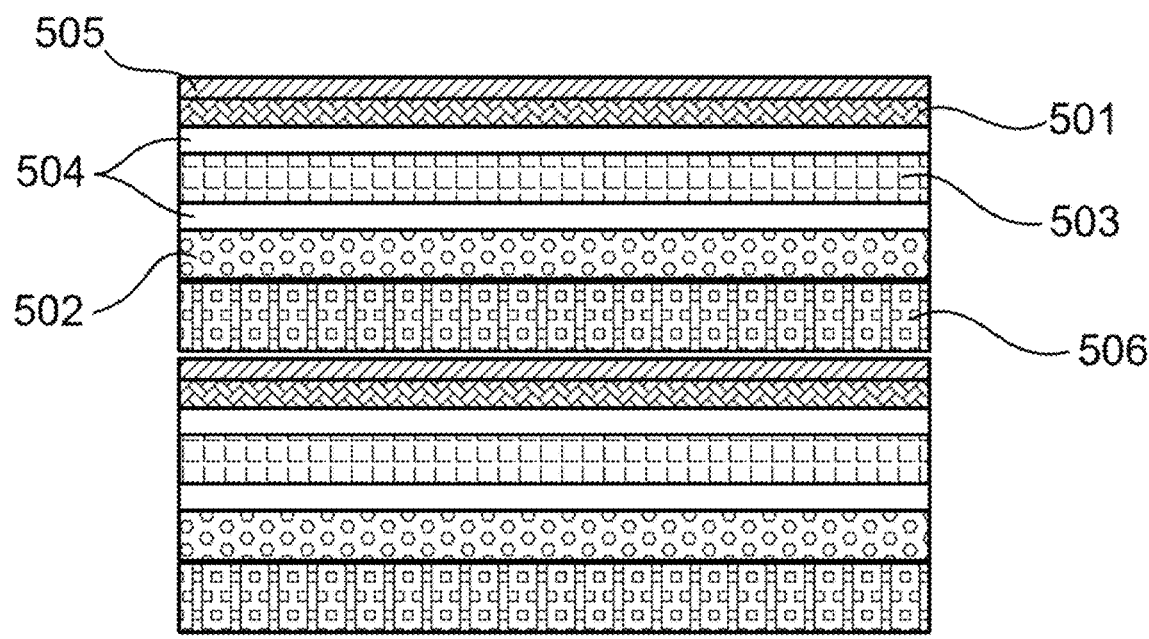
FIG. 2 illustrates a fuel cell stack having two repeat units (or two fuel cells), according to an embodiment of this disclosure.

FIG. 2 depicts two fuel cells in a fuel cell stack. In the illustrated embodiment, the anode, cathode, electrolyte, and interconnect are cuboids or rectangular prisms. Item 501 schematically represents the anode; 502 represents the cathode; 503 represents the electrolyte; 504 represents the barrier layers; 505 represents the catalyst; and 506 represents the interconnect. Two fuel cell repeat units or two fuel cells form a stack as illustrated. As is seen, on one side the interconnect is in contact with the largest surface of the cathode of the top fuel cell (or fuel cell repeat unit) and on the opposite side the interconnect is in contact with the largest surface of the catalyst (optional) or the anode of the bottom fuel cell (or fuel cell repeat unit). These repeat units or fuel cells are connected in parallel by being stacked atop one another and sharing an interconnect in between via direct contact with the interconnect rather than via electrical wiring. This kind of configuration is in contrast to segmented-in-series (SIS) type fuel cells.

Cathode. In an embodiment, the cathode comprises perovskites, such as LSC, LSCF, LSM. In an embodiment, the cathode comprises lanthanum, cobalt, strontium, manganite. In an embodiment, the cathode is porous. In an embodiment, the cathode comprises YSZ, Nitrogen, Nitrogen Boron doped Graphene, La0.6Sr0.4Co0.2Fe0.8O3, SrCo0.5Sc0.5O3, BaFe0.75Ta0.25O3, BaFe0.875Re0.125O3, Ba0.5La0.125Zn0.375NiO3, Ba0.75Sr0.25Fe0.875Ga0.125O3, BaFe0.125Co0.125, Zr0.75O3. In an embodiment, the cathode comprises LSCo, LCo, LSF, LSCoF. In an embodiment, the cathode comprises perovskites LaCoO3, LaFeO3, LaMnO3, (La,Sr)MnO3, LSM-GDC, LSCF-GDC, LSC-GDC. Cathodes containing LSCF are suitable for intermediate-temperature fuel cell operation.

In an embodiment, the cathode comprises a material selected from the group consisting of lanthanum strontium manganite, lanthanum strontium ferrite, and lanthanum strontium cobalt ferrite. In an embodiment, the cathode comprises lanthanum strontium manganite.

Anode. In an embodiment, the anode comprises Copper, Nickle-Oxide, Nickle-Oxide-YSZ, NiO-GDC, NiO—SDC, Aluminum doped Zinc Oxide, Molybdenum Oxide, Lanthanum, strontium, chromite, ceria, perovskites (such as, LSCF [La{1-x}Sr{x}Co{1-y}Fe{y}O3] or LSM [La{1-x}Sr{x}MnO3], where x is usually 0.15-0.2 and y is 0.7 to 0.8). In an embodiment, the anode comprises SDC or BZCYYb coating or barrier layer to reduce coking and sulfur poisoning. In an embodiment, the anode is porous. In an embodiment, the anode comprises combination of electrolyte material and electrochemically active material, combination of electrolyte material and electrically conductive material.

In an embodiment, the anode comprises nickel and yttria stabilized zirconia. In an embodiment, the anode is formed by reduction of a material comprising nickel oxide and yttria stabilized zirconia. In an embodiment, the anode comprises nickel and gadolinium stabilized ceria. In an embodiment, the anode is formed by reduction of a material comprising nickel oxide and gadolinium stabilized ceria. Electrolyte. In an embodiment, the electrolyte in a fuel cell comprises stabilized zirconia e.g., YSZ, YSZ-8, Y0.16Zr0.84O2. In an embodiment, the electrolyte comprises doped LaGaO3, e.g., LSGM, La0.9Sr0.1Ga0.8Mg0.2O3. In an embodiment, the electrolyte comprises doped ceria, e.g., GDC, Gd0.2Ce0.8O2. In an embodiment, the electrolyte comprises stabilized bismuth oxide e.g., BVCO, Bi2V0.9Cu0.1O5.35.

[63] In an embodiment, the electrolyte comprises zirconium oxide, yttria stabilized zirconium oxide (also known as YSZ, YSZ8 (8mole % YSZ)), ceria, gadolinia, scandia, magnesia, calcia. In an embodiment, the electrolyte is sufficiently impermeable to prevent significant gas transport and prevent significant electrical conduction; and allow ion conductivity. In an embodiment, the electrolyte comprises doped oxide such as cerium oxide, yttrium oxide, bismuth oxide, lead oxide, lanthanum oxide. In an embodiment, the electrolyte comprises perovskite, such as, LaCoFeO3 or LaCoO3 or Ce0.9Gd0.1O2 (GDC) or Ce0.9Sm0.1O2 (SDC or samaria doped ceria) or scandia stabilized zirconia.

In an embodiment, the electrolyte comprises a material selected from the group consisting of zirconia, ceria, and gallia. In an embodiment, the material is stabilized with a stabilizing material selected from the group consisting of scandium, samarium, gadolinium, and yttrium. In an embodiment, the material comprises yttria stabilized zirconia.

Interconnect. In an embodiment, the interconnect comprises silver, gold, platinum, AISI441, ferritic stainless steel, stainless steel, Lanthanum, Chromium, Chromium Oxide, Chromite, Cobalt, Cesium, Cr2O3. In an embodiment, the anode comprises LaCrO3 coating on Cr2O3 or NiCo2O4 or MnCo2O4 coatings. In an embodiment, the interconnect surface is coated with Cobalt and/or Cesium. In an embodiment, the interconnect comprises ceramics. In an embodiment, the interconnect comprises Lanthanum Chromite or doped Lanthanum Chromite. In an embodiment, the interconnect is made of a material comprising metal, stainless steel, ferritic steel, crofer, lanthanum chromite, silver, metal alloys, nickel, nickel oxide, ceramics, or graphene.

Catalyst. In various embodiments, the fuel cell comprises a catalyst, such as, platinum, palladium, scandia, chromium, cobalt, cesium, CeO2, nickel, nickel oxide, zinc, copper, titania, ruthenium, rhodium, MoS2, molybdenum, rhenium, vanadium, manganese, magnesium, iron. In various embodiments, the catalyst promotes methane reforming reactions to generate hydrogen and carbon monoxide for them to be oxidized in the fuel cell. Very often, the catalyst is part of the anode, especially nickel anode has inherent methane reforming properties. In an embodiment, the catalyst is between 1%-5%, or 0.1% to 10% by mass. In an embodiment, the catalyst is used on the anode surface or in the anode. In various embodiments, such anode catalysts reduce harmful coking reactions and carbon deposits. In various embodiments, simple oxide version of catalysts is used or perovskite. For example, 2% mass CeO2 catalyst is used for methane-powered fuel cells. In various embodiments, the catalyst is dipped or coated on the anode. In various embodiments, the catalyst is made by additive manufacturing.

EXAMPLES

The following examples are provided as part of the disclosure of various embodiments of the present invention. As such, none of the information provided below is to be taken as limiting the scope of the invention.

Example 1.

Making a Fuel Cell Stack.

[68] The method uses an AMM model no. 0012323 from Ceradrop and an EMR model no. 092309423 from Xenon Corp. An interconnect substrate is put down to start the print.

As a first step, an anode layer is made by the AMM. This layer is deposited by the AMM as a slurry A, having the composition as shown in the table below. This layer is allowed to dry by applying heat via an infrared lamp. This anode layer is sintered by exposing it with electromagnetic radiation from a xenon flash tube for 1 second.

An electrolyte layer is formed on top of the anode layer by the AMM depositing a slurry B, having the composition shown in the table below. This layer is allowed to dry by applying heat via an infrared lamp. This electrolyte layer is sintered by exposing it with electromagnetic radiation from a xenon flash tube for 60 seconds.

Next a cathode layer is formed on top of the electrolyte layer by the AMM depositing a slurry C, having the composition shown in the table below. This layer is allowed to dry by applying heat via an infrared lamp. This cathode layer is sintered by exposing it with electromagnetic radiation from a xenon flash tube for ½ second.

An interconnect layer is formed on top of the cathode layer by the AMM depositing a slurry D, having the composition shown in the table below. This layer is allowed to dry by applying heat via an infrared lamp. This interconnect layer is sintered by exposing it with electromagnetic radiation from a xenon flash tube for 30 seconds. These steps are then repeated 60 times, with the anode layers being formed on top of the interconnects. The result is a fuel cell stack with 61 fuel cells.

| Composition of Slurries | | |
|---|---|---|
| Slurry | Solvents | Particles |
| A | 100% isopropyl alcohol | 10 wt % NiO-8YSZ |
| B | 100% isopropyl alcohol | 10 wt % 8YSZ |
| C | 100% isopropyl alcohol | 10 wt % LSCF |
| D | 100% isopropyl alcohol | 10 wt % lanthanum chromite |

Example 2.

Sintering Results.

Figure 3:
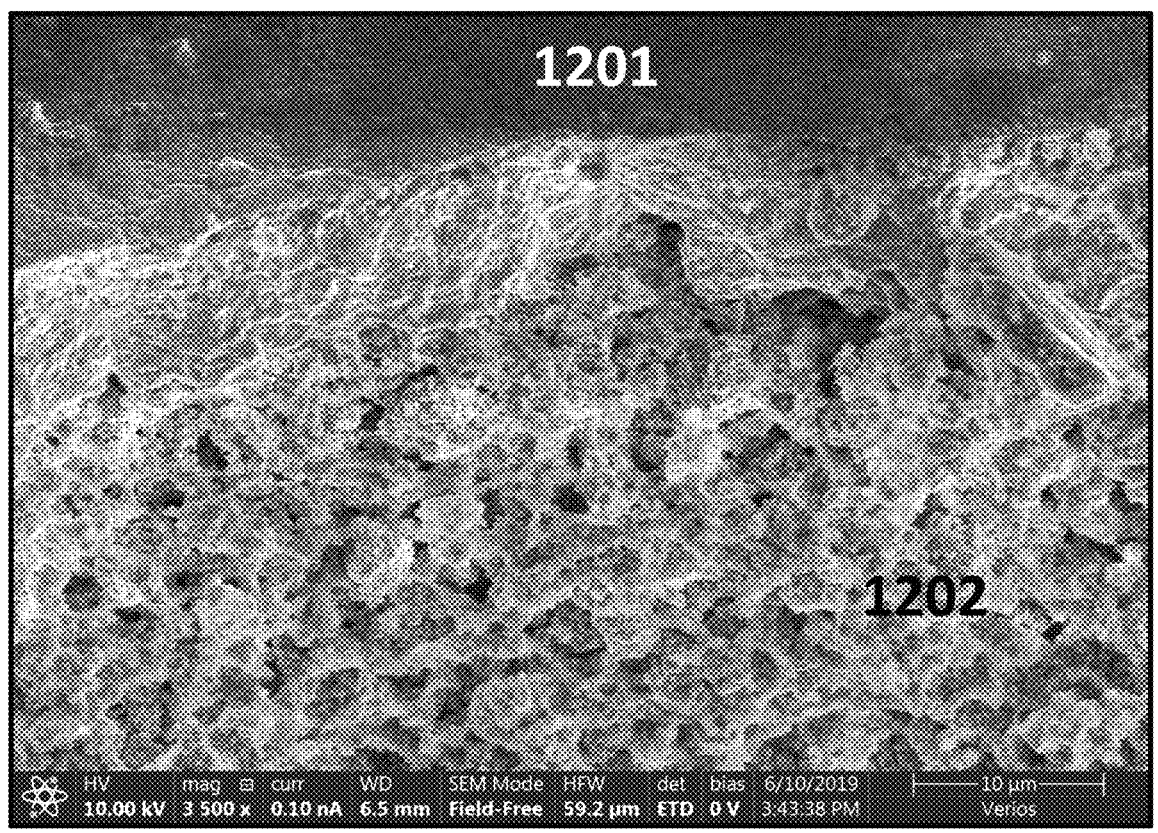
FIG. 3 is a scanning electron microscopy image (side view) illustrating an electrolyte (YSZ) printed and sintered on an electrode (NiO—YSZ), according to an embodiment of this disclosure.

Referring to FIG. 3, an electrolyte 1201 (YSZ) is printed and sintered on an electrode 1202 (NiO—YSZ). The scanning electron microscopy image shows the side view of the sintered structures, which demonstrates gas-tight contact between the electrolyte and the electrode, full densification of the electrolyte, and sintered and porous electrode microstructures.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method of heating a material having a surface comprising exposing the surface to a xenon lamp emitting a first wavelength spectrum; receiving a second wavelength spectrum from the surface using a detector at a sampling frequency; wherein the first wavelength spectrum and the second wavelength spectrum have no greater than 10% of overlap, wherein the overlap is the integral of intensity with respect to wavelength, wherein the material consists of ceramics, metal oxides, or combinations thereof.

2. The method of claim 1, wherein the first wavelength spectrum and the second wavelength spectrum have no greater than 5% of overlap or no greater than 3% of overlap or no greater than 1% of overlap or no greater than 0.5% of overlap.

3. The method of claim 1, wherein the detector is a pyrometer.

4. The method of claim 1, wherein exposing the surface to the xenon lamp causes the material to sinter at least partially.

5. The method of claim 4 comprising converting the second wavelength spectrum to temperature and corelating sintering with temperature, exposure duration, exposure frequency, exposure number, radiation source power output, or combinations thereof.

6. The method of claim 4, wherein sintering is determined by microstructure images of the material, scratch adhesion test of the material, scratch hardness test of the material, electrochemical performance test of the material, dilatometry measurements of the material, conductivity measurements of the material, or combinations thereof.

7. The method of claim 1 comprising adjusting voltage supplied to the xenon lamp to change the radiation source power output or the first wavelength spectrum or both.

8. The method of claim 1 comprising converting the second wavelength spectrum to temperature and adjusting the sampling frequency according to rate of temperature change.

9. The method of claim 8, wherein the sampling frequency is higher than normalized rate of temperature change, wherein the normalized rate of temperature change is the rate of temperature change divided by the difference between a local temperature maximum and a local temperature minimum.

10. The method of claim 1, wherein a single exposure duration is no greater than 10 ms or no greater than 5 ms or no greater than 2 ms or no greater than 1 ms or in the range of 0.1-1 ms.

11. The method of claim 1, wherein total exposure duration is no greater than 10 s or no greater than 5 s or no greater than 1 s.

12. The method of claim 1, wherein the sampling frequency is no less than 100 Hz or no less than 500 Hz or no less than 1000 Hz or no less than 10,000 Hz or no less than 50,000 Hz.

13. The method of claim 1, wherein the material comprises CuO, $Cu_2O$, Cu—CGO, NiO, NiO—YSZ, lanthanum strontium cobalt ferrite (LSCF), lanthanum strontium manganite (LSM), yttria-stabilized zirconia (YSZ), gadolinia-doped ceria (CGO), samaria-doped ceria (SDC), scandia-stabilized zirconia (SSZ), lanthanum strontium gallium magnesium oxide (LSGM), ceria-yttria stabilized zirconia (CYZ), ceria-scandia stabilized zirconia (CSZ), zirconia, lanthanum chromite, doped lanthanum chromite, doped YSZ, colored zirconia, or combinations thereof.

14. The method of claim 1, wherein heating takes place in two stages, wherein the material porosity after the second stage heating is less than that after the first stage heating.

15. The method of claim 1, wherein the material comprises particles having a size distribution that has at least one of the following characteristics:
   a) said size distribution comprises D10 and D90, wherein 10% of the particles have a diameter no greater than D10 and 90% of the particles have a diameter no greater than D90, wherein D90/D10 is in the range of from 1.5 to 100; or
   b) said size distribution is bimodal such that the average particle size in the first mode is at least 5 times the average particle size in the second mode; or
   c) said size distribution comprises D50, wherein 50% of the particles have a diameter no greater than D50, wherein D50 is no greater than 400 nm.

16. The method of claim 15, wherein D10 is in the range of from 5 nm to 50 nm or from 5 nm to 100 nm or from 5 nm to 200 nm, or D90 is in the range of from 50 nm to 500 nm or from 50 nm to 1000 nm, or wherein D90/D10 is in the range of from 2 to 100 or from 4 to 100 or from 2 to 20 or from 2 to 10 or from 4 to 20 or from 4 to 10.

17. The method of claim 1, wherein the material comprises particles, wherein a first 10 wt % or more of the particles have an average diameter of d, a second 10 wt % or more of the particles have an average diameter of at least 5×d, and a third 10 wt % or more of the particles have an average diameter of at least 20×d.

18. The method of claim 17, wherein d is in the range of from 1 nm to 100 nm or from 5 nm to 50 nm or from 10 nm to 30 nm.

* * * * *